(No Model.)
M. S. FREEMANN.
AXLE NUT.
No. 336,710. Patented Feb. 23, 1886.
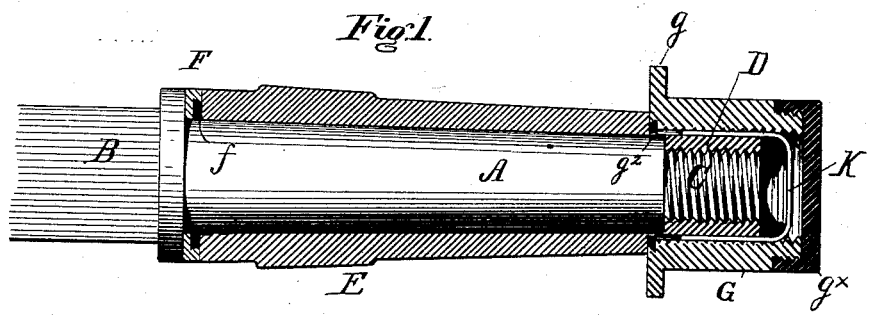
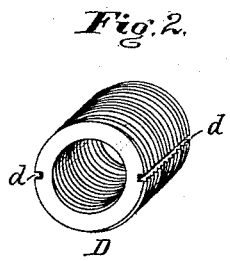
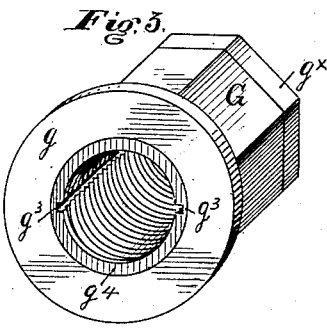
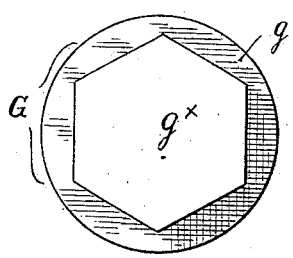
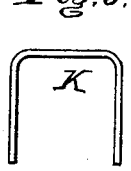
WITNESSES:
Mahlon S. Freemann
INVENTOR
By his Attorneys,
Wm C. Strawbridge
J Bonsall Taylor

UNITED STATES PATENT OFFICE.

MAHLON S. FREEMANN, OF NORRISTOWN, PENNSYLVANIA.

AXLE-NUT.

SPECIFICATION forming part of Letters Patent No. 336,710, dated February 23, 1886.

Application filed March 27, 1885. Serial No. 160,217. (No model.)

*To all whom it may concern:*

Be it known that I, MAHLON S. FREEMANN, a citizen of the United States, residing in Norristown, county of Montgomery, in the State of Pennsylvania, have invented an Improvement in Axle-Nuts, of which the following is a specification.

The object of my invention is the provision of a contrivance for not only fixedly retaining the hub of a carriage or freely revolving wheel upon its axle, but for preventing the endwise movement or movement in the direction of the longitudinal axis of the hub when its bushing has from use become somewhat worn.

In the drawings, Figure 1 is a central longitudinal vertical sectional elevation through my device, all the parts being in section except the axle, its gudgeon, and the gudgeon-stem. Fig. 2 is a perspective view of what I herein term the "axle-nut." Fig. 3 is a similar view of the flanged cap-nut with its cap applied, sight being taken from the flanged end of said cap-nut. Fig. 4 is an end view of the cap-nut from the cap end. Fig. 5 is an elevation of the key.

Similar letters of reference indicate corresponding parts.

In the drawings, A is the gudgeon of an axle, B, the outer portion of which axle is turned off to form the threaded gudgeon-stem C. Upon this gudgeon-stem is adapted to be fitted a cylindriform axle-nut, D, threaded internally to adapt it to the threads of the gudgeon-stem, and externally also threaded. The exterior diameter of this nut is but slightly in excess of the exterior diameter of the gudgeon.

E is the hub-bushing (the hub not being shown) which is mounted upon the gudgeon and bears at its inner face against a washer, F, applied to the axle.

G is a flanged cap-nut, the flange $g$ of which is circumferential and right angular to the axis of the cap-nut. The body of the cap-nut is externally many sided—in the drawings hexagonal—so as to adapt it to be screwed up through the medium of a wrench. Internally the cap-nut is threaded and of a diameter to adapt it to be screwed onto the axle-nut D. The cap-nut G is provided with a cap, $g^x$, which is adapted to be screwed over the outer end of said cap-nut, or that end which is remote from the flange. The inner circumference of the acting face of the flange of the cap-nut is provided with a packing-ring, $g^2$, of leather, rubber, gutta-percha, or other desired material. The inner washer, F, of the axle is also provided with a similar packing-ring, $f$. Externally the axle-nut is provided with longitudinally-extending key-seats $d$ $d$, which are channeled through its threads, and internally the cap-nut is similarly provided with longitudinally-extending key-seats $g^3$ $g^3$, which are likewise channeled through its threads.

K is a suitably-shaped key, conveniently fashioned from iron or made of wire and represented in detail in Fig. 5.

Such being a description of my improvement, its operation will be readily understood. The hub and its contained bushing being in place upon the axle-gudgeon, and the inner end of the bushing resting against the inner or axle washer, F, the axle-nut is screwed tightly upon the threaded gudgeon-stem. The flanged cap-nut, from which the cap has been removed, is then screwed upon the axle-nut to an extent sufficient to bring its flange against or almost against the hub and bushing, and to bring its key-seats into coincidence or registry with the key-seats of the axle-nut, whereupon the key is introduced in the manner shown in Fig. 1. The operation of the key is to prevent the rotation of the cap-nut upon the axle-nut. The cap is then screwed on the cap-nut and the application of the device is completed. The direction of the threads on the gudgeon-stem is intentionally such that in the rotation of the wheel the tendency thereof, if its movement were transmitted to the axle-nut, would be to tighten up the axle-nut upon the stem. When the bushing wears at its ends, as bushings do, it is obvious that if the cap is removed and the key taken out the cap-nut can be screwed up against the worn bushing so as to prevent the endwise thrust of the same, the key again inserted, and the device employed as before. It is obvious, therefore, that the device is of such character as to provide for the wear of the bushing, and so to be applicable to keep the hub locked in place for its most efficient duty.

Having thus described my invention, I claim and desire to secure by Letters Patent—

The combination of the axle B, the gudgeon A, provided with the threaded stem C, the hub or bushing on the gudgeon, the axle-nut D, threaded both internally and externally and provided with external key-seats, $d$, the cap-nut G, threaded internally and provided with internal key-seats, $g^3$, a key adapted to the said key-seats, and the removable cap $g^\times$ upon the cap-nut, substantially as and for the purpose described.

In testimony whereof I have hereunto signed my name this 16th day of March, A. D. 1885.

MAHLON S. FREEMANN.

In presence of—
J. BONSALL TAYLOR,
JOHN JOLLEY, Jr.